United States Patent [19]

Kravets

[11] Patent Number: 4,569,263
[45] Date of Patent: Feb. 11, 1986

[54] METHOD AND APPARATUS FOR FINE SHEARING

[75] Inventor: Mordko L. Kravets, Plymouth, Minn.

[73] Assignee: Foley-Belsaw Company, Minneapolis, Minn.

[21] Appl. No.: 614,946

[22] Filed: May 29, 1984

[51] Int. Cl.[4] .............................................. B26D 7/02
[52] U.S. Cl. ........................................ 83/19; 83/376; 83/383; 83/454; 83/581; 83/555
[58] Field of Search ................ 83/376, 377, 382, 454, 83/459, 588, 590, 694, 581, 523, 19, 14, 383, 554, 555

[56] References Cited

U.S. PATENT DOCUMENTS 1,146,554 7/1915 Clark ....................................... 83/145
4,399,725 8/1983 Milan ....................................... 83/454

Primary Examiner—James M. Meister
Assistant Examiner—John L. Knoble
Attorney, Agent, or Firm—Dorsey & Whitney

[57] ABSTRACT

A method and apparatus for fine shearing a metal workpiece involves placing the workpiece on a stationary die surface for support and driving a single punch against the workpiece such that at least a portion of the workpiece is placed in compression. The punch is then driven into and through the workpiece along a predetermined path which has a first directional component both perpendicular to and directed toward the die surface and a second directional component both parallel to the die surface and directed into the compressed portion of the workpiece. The punch is driven with a force having components both perpendicular to and parallel to the path of the punch. The force component perpendicular to the punch path is large enough to keep the compressed portion of the workpiece in a plastic state. The force component parallel to the path of the punch is large enough to overcome the shear strength of the workpiece along the path. The method and apparatus allow the formation of a variety of fine-sheared surface configurations.

18 Claims, 17 Drawing Figures

METHOD AND APPARATUS FOR FINE SHEARING

BACKGROUND OF THE INVENTION

1. Field of the Invention

This invention relates to a method and apparatus for shear forming a metal workpiece. More particularly, the invention relates to a punch press tool and method for fine shearing a workpiece by driving a punch or tool into and through the workpiece along a predetermined path. The directional components of the punch path and the force with which the punch is driven are such that the area of shearing is kept in compression and in a plastic state so that controlled shearing without fracture occurs.

2. Description of the Prior Art

Metal parts produced by conventional punch presses and methods often require machining or other finishing subsequent to punch forming. The need for further machining is due to the tendency of the metal workpiece to fracture ahead of the cutting tool or punch, which leaves the punched edges cleanly sheared through only a portion of the workpiece's thickness. With a typical punch shearing operation, 15% to 30% of the sheared edge has a smooth surface, followed by 70% to 85% which has a somewhat irregular fracture. Further machining to produce a clean edge requires time and equipment and increases costs of production; its elimination is therefore highly desirable.

Several prior methods are known for punch press manufacture of precision parts that do not require subsequent machining. One method is a cold forming technique called fine-edge blanking, also known as fine blanking, smooth-edge blanking or fine flow blanking. (In the case of hole rather than edge forming, it is called fine-edge piercing.). The apparatus used to execute this method uses a V-shaped impingement ring located on the pressure pad near the working edge of the punch. The impingement ring is located outside the main punch surface but close enough to the punch's cutting edge so that upon punching, the impingement ring causes the workpiece metal to flow toward the punch, thereby preventing fracture of the workpiece and eliminating all but a subsequent small burr removal step. See, "Fine-Edge Blanking and Piercing", in *Production to Near Net Shape Source Book* (American Society for Metals 1983).

The above process is typically used with flat or plate stock to produce pieces having a blanked edge that is perpendicular to the unworked top and bottom surfaces of the workpiece, as in conventional punch press methods. The utility and range of uses of the punch press even with the above process have thus been limited. Applications requiring a piece to have an edge or chamfer formed at an angle other than 90° to the plate surfaces of the workpiece have, to applicant's knowledge, not been satisfied through the use of fine edge blanking on current punch presses.

Cold flow forming of metals using specially shaped, axially aligned dies is also known (see U.S. Pat. No. 4,177,665), as is the use of two-blow die designs for forming specially shaped parts (see U.S. Pat. No. 3,945,071). Also known is a method for fine shearing aluminum bar or other non-ferrous alloys transversely at 90° by placing axial compressive stress on the bar prior to shearing. (Hungarian Pat. No. 152,686) Neither these nor other known approaches have shown themselves suitable for fine shearing metal stock to produce a broad variety of shaped surfaces on metal parts, including such commonly used items as cutting blades, saw teeth or beveled edges for welding, such that the sheared surface needs little or no finishing.

The prior work of the present inventor is also part of the background of the present invention. In U.S.S.R. Inventor's Certificate No. 407,726 a method of chamfer forming on sheet metal material is discussed. The method involves two overlapping tools exerting opposing perpendicular forces on a piece of sheet material between them. The upper tool is led straight downward into the sheet material. The lower tool is also led into the sheet material with a sideways motion that reduces the amount of overlap between the tools and forces material out. When the tools meet with minimal clearance between them the sheet material is fully cut. No description is given of the manner in which tool motion is caused; nor is there any discussion of the size or direction of forces required to produce cutting or to achieve smooth cutting without fracture. In U.S.S.R. Inventor's Certificate No. 415,068 a press tool for cutting and chamfer forming the end of a bar is discussed. The tool involves a punch with a working edge and a cutting edge opposite the working edge. A two-part die is placed below the punch, and the bar to receive the chamfer is placed on both die parts. One part of the die is movable in a direction perpendicular to the vertical stroke of the punch; the other part is stationary. As the punch descends, it acts through a cam arrangement to cause the movable part of the die to translate laterally at the same time that the workpiece is being driven downward. The cutting edge of the descending punch and the stationary part of the die vertically cut one side of the bar piece while the movable portion of the die cooperates with the working edge of the punch to cut the chamfer on the other side of the bar piece. The cut-off bar piece falls between the two die parts. No discussion of the size or direction of forces required to produce cutting or to achieve smooth cutting appears.

SUMMARY OF THE INVENTION

In accordance with the present invention, a cleanly sheared surface is formed to net shape on a metal workpiece placed on the working surface of a stationary die.

More specifically, a finely sheared surface is formed by driving a punch against a stationary workpiece supported on a stationary die surface such that at least a portion of the workpiece is placed in compression. The punch is then driven into and through the workpiece along a predetermined path which has a first directional component both perpendicular to and directed toward the die surface and a second directional component both parallel to the die surface and directed toward the compressed portion of the workpiece. The punch is driven with a force having components both perpendicular to and parallel to the path of the punch. The force component perpendicular to the punch path is large enough to keep the compressed portion of the workpiece in a plastic state. The force component parallel to the path of the punch is large enough to overcome the shear strength of the workpiece along the path.

In an apparatus embodying the invention, the workpiece is placed on a stationary die and secured by means of a clamping wedge. A punch assembly including a cam follower is brought down toward the die with high compressive force (delivered, for example, by a punch press) to contact and follow a cam surface on the clamping wedge, which serves as a cam for determining the shape of the sheared surface. The cam shape and position are also selected so that the punch overlaps the stationary die surface on which the workpiece is supported and places at least a portion of the workpiece in compression when the lower or compression surface of the punch initially contacts the workpiece. A pusher assembly located just below the die surface helps maintain the workpiece against bending moment while the punch moves through the workpiece along a path commensurate with the shape of the clamping wedge cam surface.

A punch travel assembly permits lateral movement of the punch as dictated by the clamping wedge cam surface. Due to the action between the cam surface and the cam follower connected to the punch, the punch is driven into and through the workpiece along a predetermined path which has a first directional component both perpendicular to and directed toward the die surface and a second directional component both parallel to the die surface and directed toward the compressed portion of the workpiece. Also due to the camming action, the original high downward compressive force is transformed, and the punch is driven through the workpiece with a force having components both perpendicular to and parallel to the path of the punch. The force component perpendicular to the punch path is large enough to keep the compressed portion of the workpiece in a plastic state. The force component parallel to the path of the punch is large enough to overcome the shear strength of the workpiece along the path.

The method and apparatus allow the formation of a variety of fine sheared surface configurations. The resulting workpiece has the desired sheared surface configuration with a smooth sheared finish which, for most applications, eliminates the need for further machining.

DESCRIPTION OF THE PREFERRED EMBODIMENT

Figure 1:
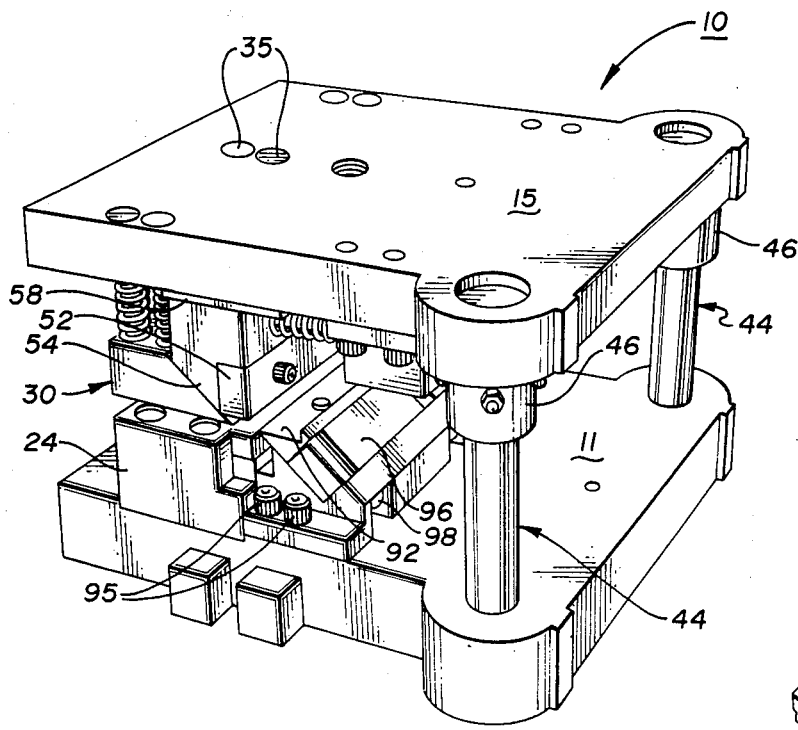
FIG. 1 is a perspective view of the inventive apparatus to be used in a commercial press (not shown)

A perspective view of an apparatus embodying the present invention for fine shearing a metal workpiece is shown in FIG. 1. Referring also to FIGS. 2–6, the apparatus 10 generally comprises a bottom plate 11; a top plate 15; a die assembly 20 located on the bottom plate 11; a punch assembly 50 located above the die assembly 20; a pusher assembly 90 disposed to the right of the die assembly 20; and a clamping wedge assembly 30. A workpiece 100 is placed for fine shearing between the clamping wedge assembly 30 and the die assembly 20 (see FIGS. 7–9).

The bottom plate 11 is a flat, generally rectangular steel piece having a recess portion 12 in its top surface. The top plate 15, located above the bottom plate 11, has the same general shape as bottom plate 11. For operation, the apparatus is placed in a punch press with the bottom plate 11 resting on the pedestal of the punch press.

Figure 3:
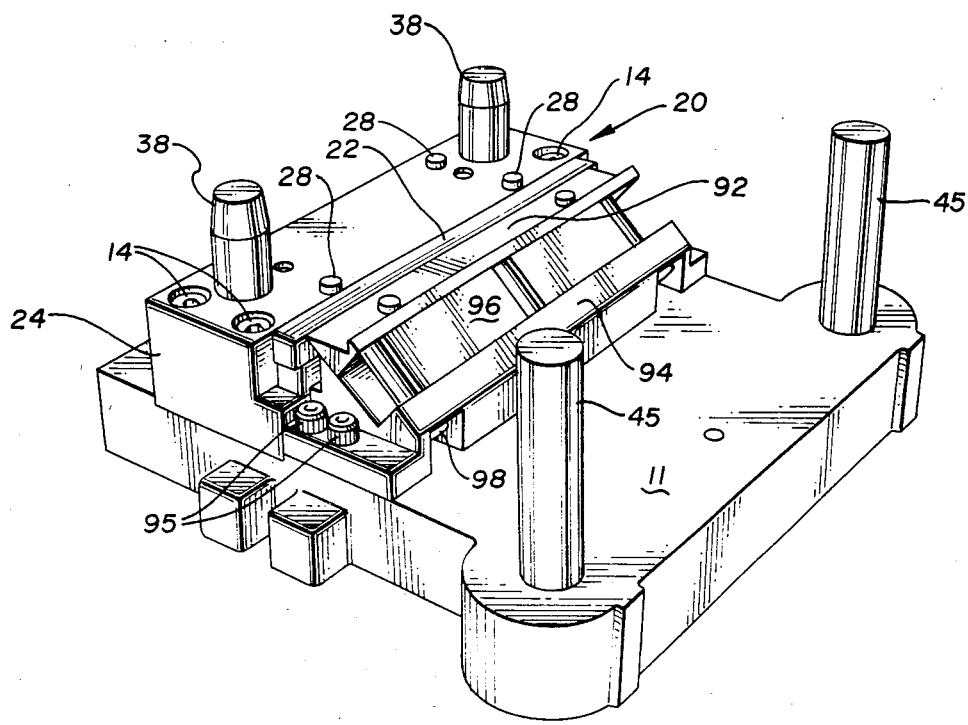
FIG. 3 is a perspective view looking down at the lower half of the apparatus of FIG. 1.
Figure 4:
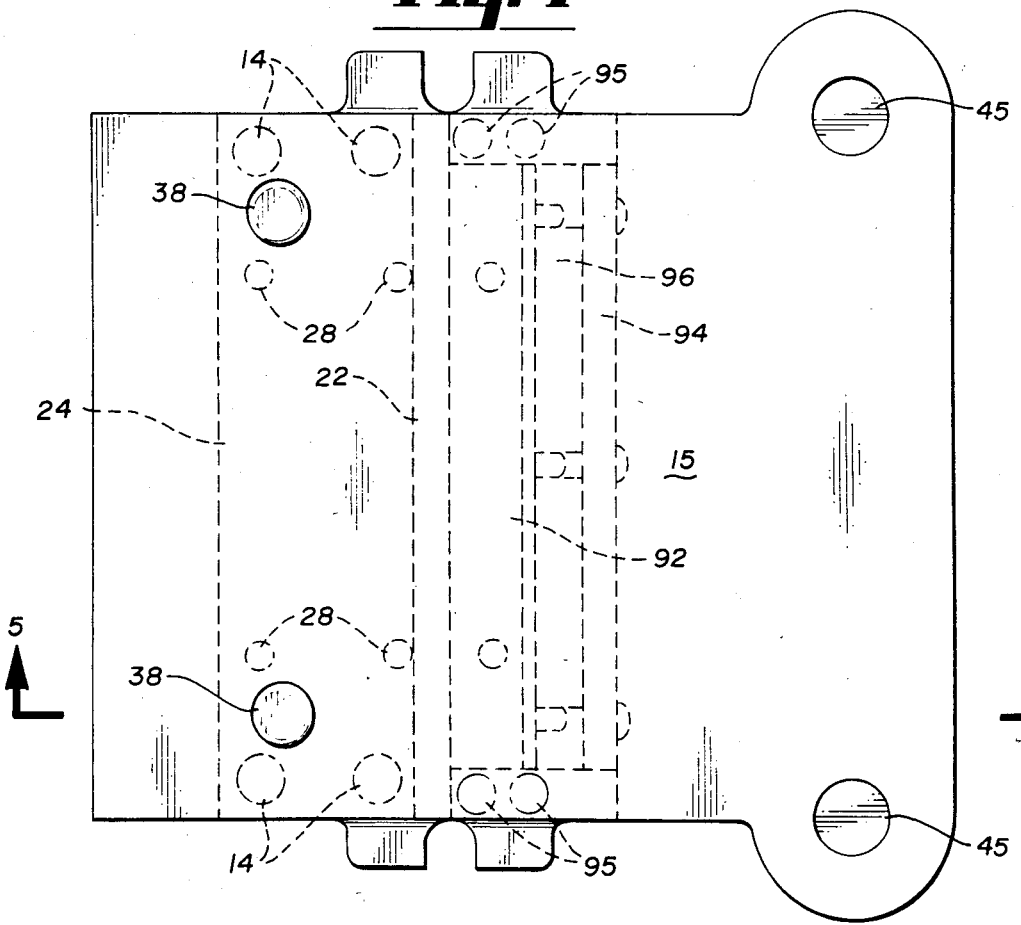
FIG. 4 is a top plan view of the apparatus.
Figure 5:
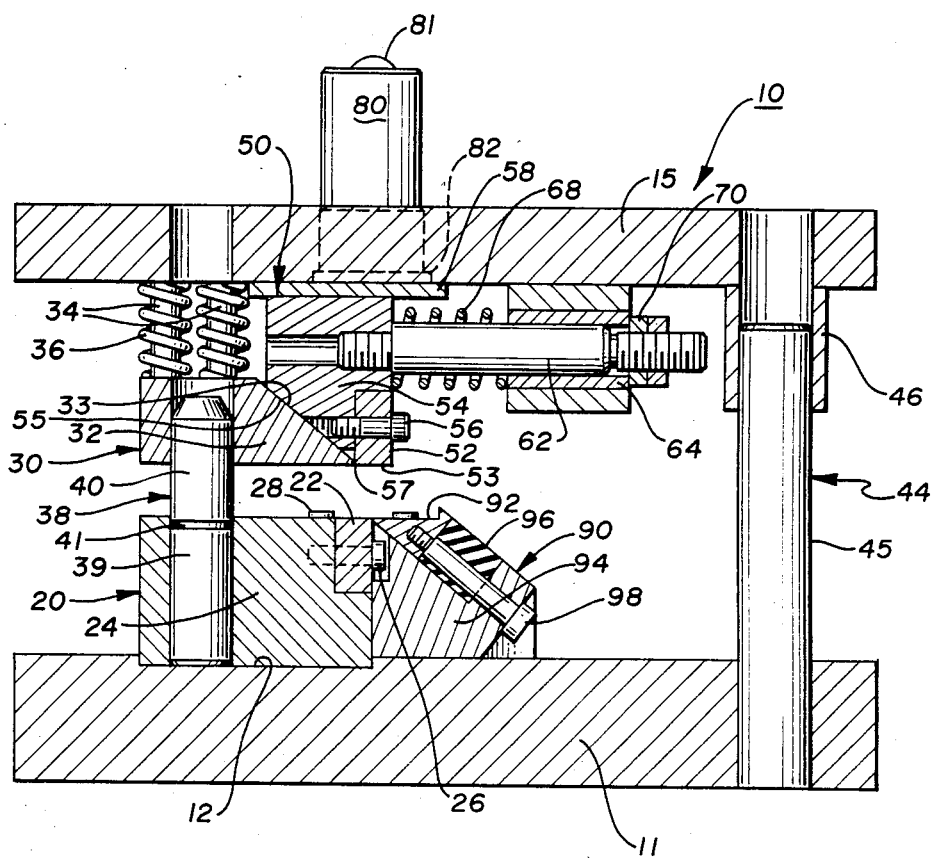
FIG. 5 is a sectional elevation taken along line 5—5 of FIG. 4.
Figure 6:
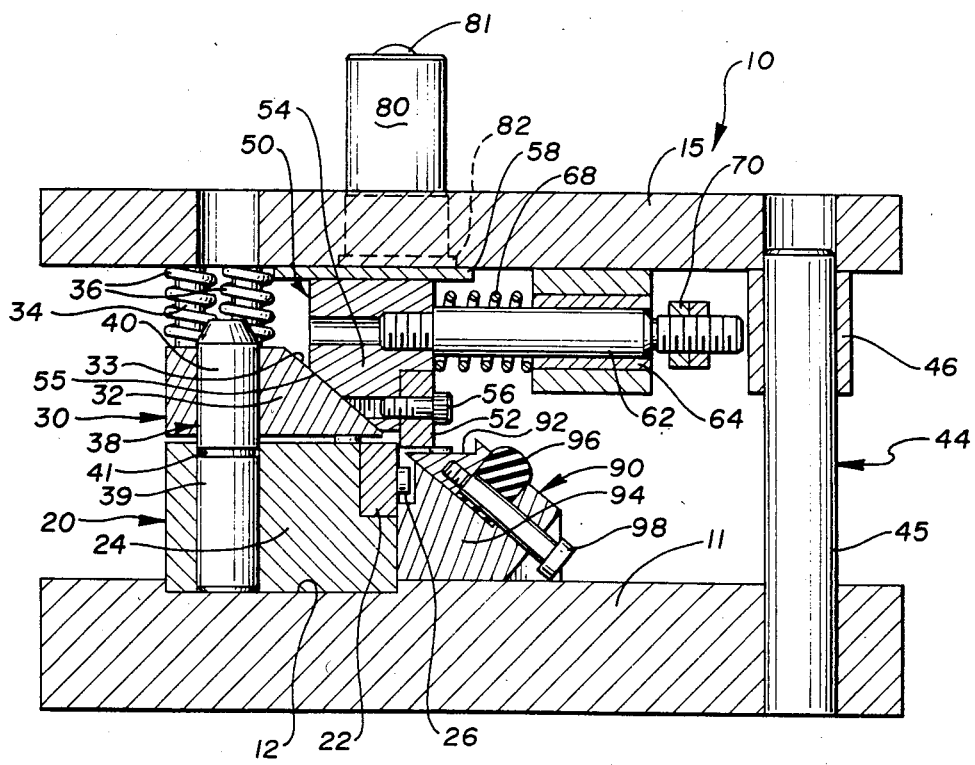
FIG. 6 is a sectional elevation taken along line 5—5 of FIG. 4 with the apparatus shown in a position corresponding to a completed fine shearing operation.

The die assembly 20, comprises a die 22 held in a die holder block 24 with die securing screws 26. In the top of the die holder block 24 are guide/stop pins 28. The die holder block 24 is an elongated, essentially rectangular, solid steel piece extending across essentially the full width of the bottom plate 11. The die holder block 24 sits in the recess 12 located in the top surface of bottom plate 11 (to secure it against lateral forces) and is also secured by four screws 14, a pair at each end. The die 22 of special tool steel is secured to die holder block 24 at its upper right corner as best seen in FIGS. 3, 5 and 6. The upper surface of the die 22 is a working surface 23 on which the workpiece 100 is placed, held stationary and compressed as described in greater detail below. The guide/stop pins 28 are set in the top surface of die holder block 24 in pairs at spaced intervals. The shaft of each guide/stop pin 28 is sunk into the top surface of die holder block 24, while the head of each of the guide stop/pins 28 rests on its top surface.

The clamping wedge assembly 30 comprises a clamping wedge 32, six shoulder screws 34 and six springs 36. The clamping wedge assembly 30, located above the die holder 20, is used to hold the workpiece 100. The shoulder screws 34 pass through bores in the top plate 15 which are countersunk into the top surface of top plate 15 so that the shoulder screw heads 35 are recessed into the top plate 15. The shoulder screws 34 are screwed into the upper surface of the clamping wedge 32. The shoulder bolts 34 are free to slide through the top plate 15 when it moves up and down. Clamping wedge 32 extends essentially the width of die holder block 24 and rests upon the workpiece 100 and/or the guide/stop pins 28. The springs 36 encircle each shoulder screw 34 in the area between the top of the clamping wedge 32 and the lower surface of the top plate 15.

The clamping wedge 32 is attached to the die holder block 24 by two large guide pins 38, one located at each end of the clamping wedge 32. Each guide pin 38 has a lower segment 39 and an upper segment 40, separated by a narrow relief band 41. The lower segment 39 of each guide pin 38 is press fit into a bore in the die holder block 24, with its lower end butting against the bottom of the recess 12. Each upper segment 40 passes through a bore in each end in the clamping wedge 32. The fit between each upper segment 40 and its corresponding bore in the clamping wedge 32 is snug but permits the clamping wedge 32 to be lifted on and off.

On the opposite side of the bottom plate 11 from the clamping wedge 32 is a pair of alignment pin assemblies 44. Each comprises a shaft 45 and a bushing 46. Each shaft 45 is fixedly attached to a half round lobe on the bottom plate 11 and its upper end slides inside its bushing 46. Each bushing 46 is secured to the top plate 15.

The punch assembly 50 comprises a punch 52, a punch holder 54 and screws 56 that secure the punch 52 to the punch holder 54. The punch holder 54 is a rectangular solid steel block with one lower corner beveled and the other recessed to hold the punch 52. The upper surface of the punch holder 54 is parallel to and bears against the underside of the top plate 15 on pad plate 58 fastened to the top plate 15 by four countersunk screws (not shown). The beveled or cam follower surface 55 of punch holder 54 is parallel to and bears against the angled cam surface 33 of the clamping wedge 32. Thus, the angled cam surface 55 of punch holder 54 makes the same angle with bottom plate 11 as does the clamping wedge 32. The punch 52 is made of tool steel and secured to the punch holder 54 by screws 56 which are threaded into the punch holder 54. The underside of the punch 52 is a compression surface 53 which is driven against a workpiece 100, while the fine shearing actually occurs at the adjacent cutting edge 57. Passing through the top plate 15 and held in place by pad plate 58 midway between the side edges of the top plate 15 is the shank 80. The lower end of the shank 80 has a flange 82 which rests in a recess in the top plate 15 and against the upper surface of the pad plate 58. The upper end of the shank 80 is capped with a rounded crown 81 to receive the downward stroke of the punch press (not shown).

Also part of the punch assembly 50 are two punch horizontal travel assemblies, 60, 60, approximately equally spaced between the ends of the punch holder 54. Each punch horizontal travel assembly 60 comprises an axle 62 with reduced diameter ends, a bushing 64, a spring 68, and a pair of jam nuts 70. An axle mount block 66 is secured to the top plate 15 by four screws 67. The bushing 64 is inserted within the axle mount 66; it allows the axle 62 to move slidably therein. One end of each axle 62 is threaded into the punch holder 54. A spring 68 surrounds the axle 62 in the area between the punch holder 54 and axle mount 66. A jam nut pair 70 is threaded onto the opposite end of the axle 62. When the punch assembly 50 is in its rest position, the spring 68 biases the punch holder 54 against the clamping wedge 32 and the jam nut pair 70 is in contact with the adjacent end of the bushing 64 (FIG. 5). As the punch assembly 50 is driven downward and displaced by the clamping wedge 32, each spring 68 is compressed and each jam nut pair 70 is displaced from the bushing 64 (FIG. 6). It should also be noted that adjustment of the jam nut pair 70 can be used to adjust the rest position of the punch assembly 50.

The pusher assembly 90 comprises a pusher block 92, a pusher holder 94, a pair of shoulder screws 98, and a buffer 96. The pusher assembly 90 extends across substantially the full width of the apparatus. The pusher holder 94 is secured at its ends to the bottom plate 11 by four screws 95 which secure the pusher holder 94 immediately adjacent the die holder block 24. The pair of shoulder screws 98 extends upwardly through the pusher holder 94 at an angle and screws into the pusher block 92, one shoulder screw 98 at each end of the pusher assembly 90. All parts of the pusher assembly 90 are steel except for the buffer 96, which is hard rubber and rests between the pusher block 92 and the outer lip of the pusher holder 94. Because the screws 98 slide in the bores through the pusher holder 94, different sizes of buffers 96 can be used to raise or lower the pusher block 92.

Figure 14A:
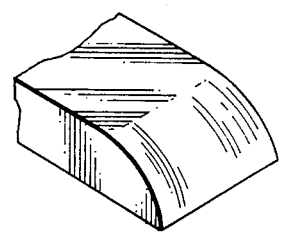
FIGS. 14a and 14b are side perspective views of items produced by alternative embodiments of the invention.
Figure 12:
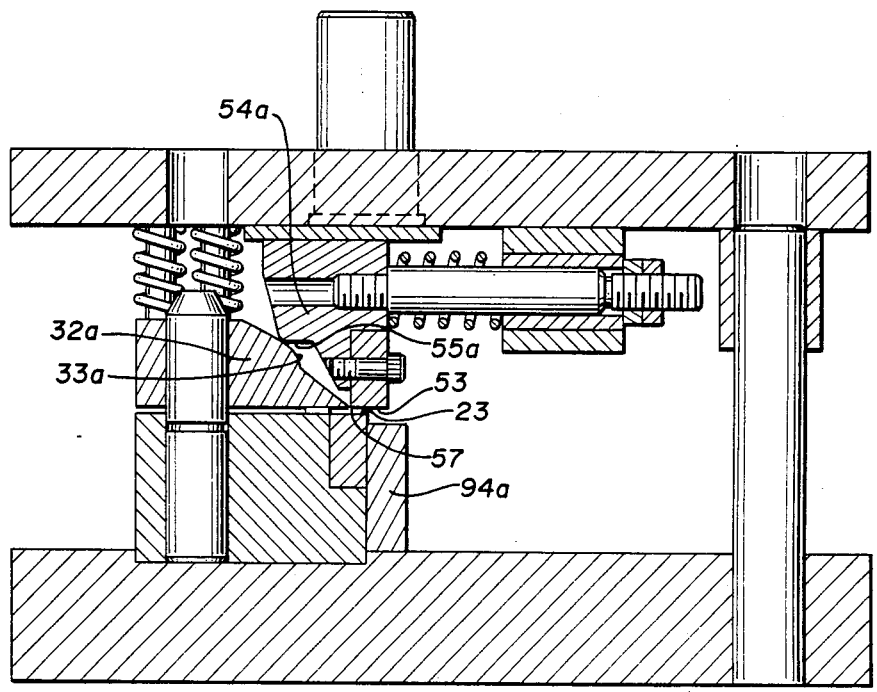
FIG. 12 is a sectional elevation as in FIG. 5, but showing an alternative embodiment of the cam and pusher assembly portions of the invention.

In an alternative embodiment of the apparatus shown in FIG. 12, two variations on the basic apparatus as shown in FIGS. 1-9 are presented. The first variation has to do with the cam arrangement which controls the path of travel of the cutting edge 57 of the punch 52. While the invention as shown in FIGS. 1-9 would cause the punch 52 to travel along a linear path, the cam arrangement as shown in FIG. 12 has a clamping wedge 32a with a curved cam surface 33a. To better follow the curved cam surface 33a, the shape of the punch block 54a is modified so that the cam surface 55a has a rounded follower lobe. The effect of the curved cam surface will be to cause fine shearing to occur along a curved surface in the workpiece 100. An example of the type of sheared surface resulting from use of this cam arrangement is shown in FIG. 14a.

The second variation on the invention shown in FIG. 12 has to do with the pusher assembly 90. As will be recognized, the pusher assembly 90 shown in FIGS. 1-9 is designed to yield as the portion of the workpiece 100 which is displaced by the punch 52 moves below the working surface 23 of the die 22. The amount of resistance offered by the pusher assembly 90 is determined by the compressibility of the rubber buffer 96 and the degree to which it is compressed. A primary purpose of the pusher assembly 90 is to limit the bending moment exerted on the portion of the workpiece 100 which is displaced downward. (The greater the bending moment, the greater the tensile stresses in the workpiece 100, which may lead to uncontrolled fracture.) In the variation of the invention shown in FIG. 12, the pusher holder 94 is replaced by a single support block 94a. The upper surface of the support block 94a lies below the die working surface 23 a distance less than the thickness of the workpiece 100, so that before a fine shearing operation is complete, the portion of the workpiece 100 which is displaced downward will be placed in additional compression. This compression is, in part, transmitted back up into the area of the workpiece where shearing is occurring, helping to maintain that area in compression and to counteract tensile forces which may develop in the unsupported area of the workpiece 100 near the outer edge of the die 22.

Figure 13:
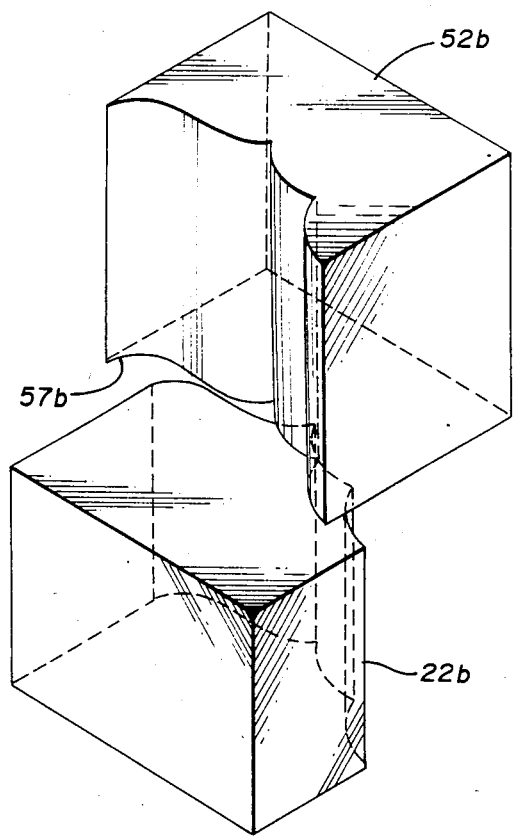
FIG. 13. is a perspective view of an alternative form for the punch and die of the present invention.

An additional variation on the basic apparatus is shown in FIG. 13, which depicts an alternative embodiment of the punch 52. In this alternative punch 52b the cutting edge 57b of the punch is not a straight line but rather a curvilinear pattern, including both continuous curved portions and discontinuous curved portions. When such a punch 52b is used with a flat surface cam arrangement as shown in FIGS. 1-9, the result is a sheared contour which varies in slope and whose upper and lower edges have the same shape as the cutting edge 57b of the punch 52b (see part shown FIG. 14b). Use of a punch 52b of this type requires use of a die 22b having a matching profile at its outer edge, as shown in FIG. 13.

Method and Operation

Figure 7:
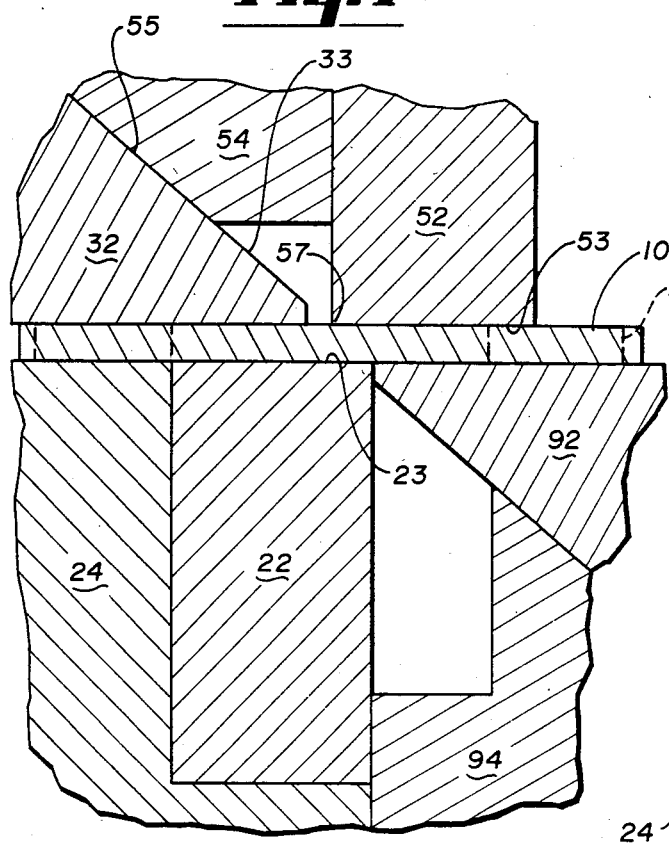
FIG. 7 is a sectional detail of FIG. 5 with a workpiece added and clamped.
Figure 8:
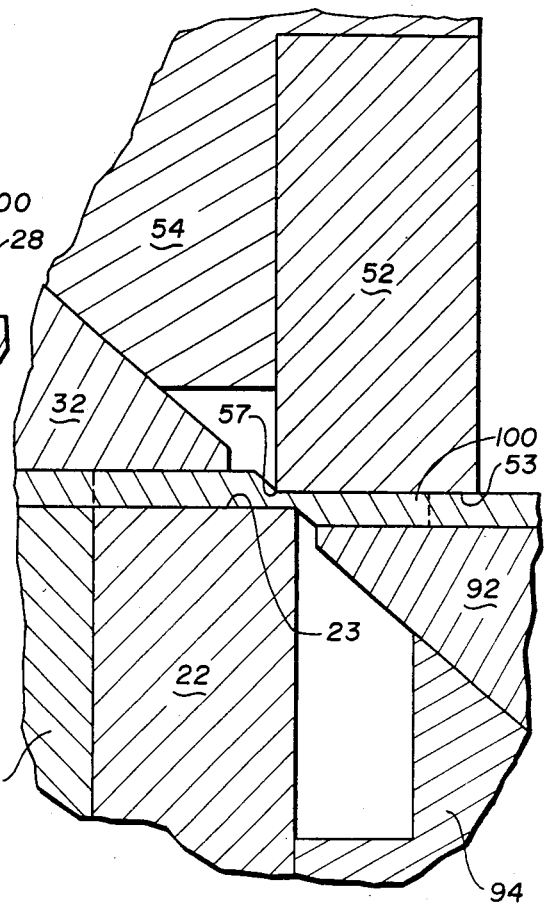
FIG. 8 is a detail as in FIG. 7 with the apparatus advanced and fine shearing underway.
Figure 9:
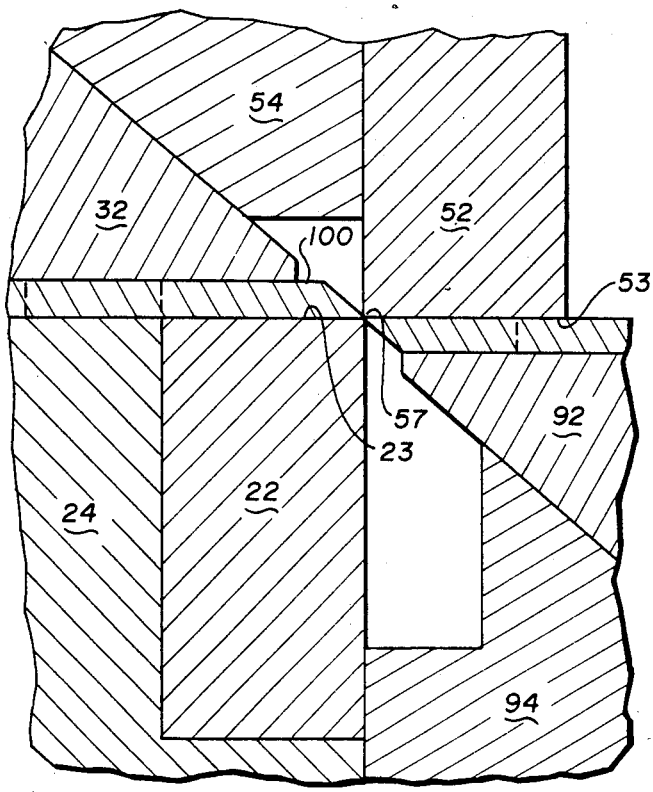
FIG. 9 is a detail as in FIGS. 7 and 8 with the apparatus further advanced.

In operation, the metal workpiece 100 (FIGS. 7-9 show plate stock as an example) is placed between the die holder 24 and the clamping wedge 32 to rest upon die holder 24 and the working surface 23 of die 22. The guide/stop pins 28 will help keep the workpiece 100 from sliding off the ends of the die holder 24; that is, the workpiece 100 is placed within the confines of the guide pins 28. The clamping wedge 32 rests on the workpiece 100 instead of the guide/stop pins 28 when the workpiece 100 is thinner than the height of pins 28 above die 22. Thus, the clamping wedge 32 normally covers and exerts a moderate downward force upon the workpiece 100 to hold the workpiece 100 stationary during operation of the punch press; however, this force is small compared to the forces generated by the punch press, some of which, as will be seen, also tend to hold the workpiece 100 stationary on the die working surface 23. That portion of the workpiece 100 which is on the working surface 23 of the die and adjacent to or above the pusher block 92 remains exposed until the punch 52 is lowered.

A fine shearing operation in accordance with the inventive method proceeds when the punch press or other means (not shown) delivers its downward stroke and a large downward force to the shank 80. As the top plate 15 is forced downwardly by the shank 80, the beveled surface 55 of the punch holder 54 follows the upper or cam surface 33 of the clamping wedge 32. As the punch holder 54 moves downward, the cam surface 33 of the clamping wedge 32 forces the punch holder 54 to move laterally as well as in the downward direction of the original punch force; that is, its motion simultaneously includes a component axially aligned with the downward motion of the punch press and the shank 80, and also a component in the direction perpendicular to that downward motion. In other words, the punch holder 54 and its punch 52 move along a predetermined path which has a first directional component both perpendicular to and directed toward the die working surface 23 and a second directional component both parallel to the die working surface 23 and directed toward the exposed surface of the workpiece 100. The compression surface 53 of the punch 52 thus approaches the exposed surface of the workpiece 100 traveling at an oblique angle determined by the cam arrangement.

The movement of the punch assembly 50 in a direction parallel to the die working surface 23 is guided and resisted somewhat by the two punch horizontal travel assemblies 60. As the movement of punch 52 proceeds, the springs 68 are compressed between the punch holder 54 and the bushing 64 as the axles 62 move in a lateral (horizontal) direction, that is, toward the right in FIG. 5. The jam nut pair 70 on the right end of the axle 62 moves away from the other end of bushing 64.

Before discussing further the action of the punch 52 on the workpiece 100, it should be noted that the guide pin assemblies 44 keep the top plate 15 aligned and moving in a true vertical direction (parallel to the direction of the original punch force). Neither the springs 36 surrounding the shoulder screws 34 nor the guide pin assemblies 44 offer much resistance to the large downward force exerted on the shank 80 and the top plate 15. As the top plate 15 moves straight down, the shoulder screws 34 of the clamping wedge assembly 30 slide in their bores through the top plate 15. Also, each shaft 45 telescopes into its bushing 46 in the guide pin assemblies 44.

Returning now to the forces exerted upon the workpiece 100, when the punch 52 comes in contact with the exposed surface of workpiece 100, the punch 52 is moving both downward (in the direction of the original force of the punch press) and laterally, along the path predetermined by the cam arrangement. This cam arrangement is chosen so that there is a region of overlap between the punch 52 and the die 22 when the compression surface 53 of the punch 52 initially contacts the exposed surface of the workpiece 100. The portion of the workpiece 100 which lies in the overlap region is thus put into compression by that directional component of force which is perpendicular to the die working surface 23. The compressive force delivered by the punch 52 continues as the punch 52 moves downward and laterally toward the outer edge of the die 22, although the region compressed becomes reduced in size. Because the punch 52 also carries a laterial force component, the force exerted on the workpiece is not exclusively compressive; rather a portion of the force is a shearing force (resisted by the shear strength of the workpiece 100) which acts at the cutting edge 57 of the punch 52 as it proceeds along its predetermined path defined by the cam arrangement. Some tensile forces will also be operating on the workpiece 100 as the shearing proceeds and the portion of the workpiece above the pusher block 92 is displaced downward; but these forces remain relatively small, in part because the area of shearing is subject to a compressive force which exceeds the yield strength of workpiece 100 and places the material in a plastic state.

Figure 10A:
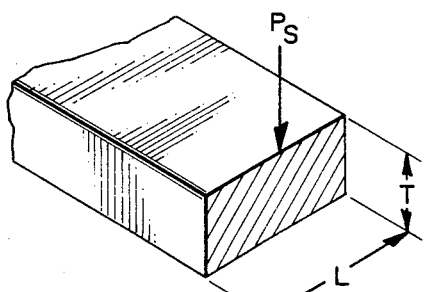
FIG. 10a is a force diagram for conventional straight blanking.
Figure 10B:
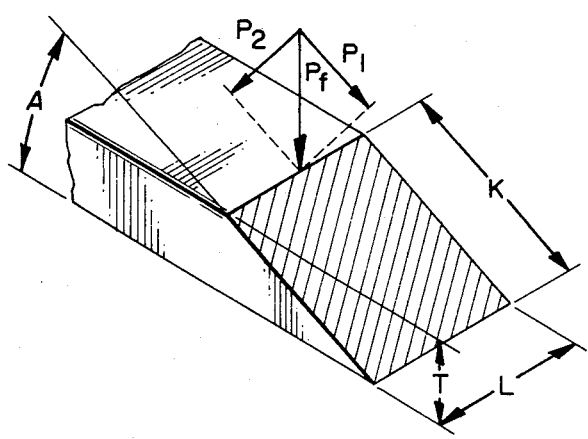
FIG. 10b is a force diagram for fine shearing using the present invention.

A further explanation of the forces required by the method of the present invention is most easily presented in terms of a comparison with straight blanking as known in the prior art, that is, a straight, 90° shear cut. FIG. 10a shows a shearing force $P_s$ acting on a member of rectangular cross section. The known formula for determining the shear force required is:

$$P_s = S \times T \times L$$

where:
$P_s$ = pressure, in pounds
S = shear strength of material, in p.s.i.
T = material thickness, in inches
L = sheared length, in inches FIG. 10b shows a fine shearing force $P_f$ acting on the same rectangular cross section member as in FIG. 10a, but showing a fine shearing operation occurring at an angle A rather than at 90°. $P_f$ is the vertical force delivered by the punch press to the workpiece 100 which is, in part, converted by the cam arrangement into a shearing force $P_1$ acting parallel to the cam surface 33. Following the above formula for determining the shear force required, the shear force $P_1$ acting at an angle A can be described as:

$$P_1 = S \times K \times L$$

where:
$P_1$ = pressure, in pounds
S = shear strength of material, in p.s.i.
K = sheared thickness when sheared at angle A, in inches
L = sheared length, in inches by trigonometry it is known:

$$K = \frac{T}{\sin A}$$

thus, $$P_1 = \frac{S \times T \times L}{\sin A}$$

Due to the cam arrangement (assuming neglible frictional effects):

$$P_1 = P_f \times \sin A$$

thus: $\frac{S \times T \times L}{\sin A} = P_f \times \sin A$ and: $P_f = \frac{S \times T \times L}{\sin^2 A} = \frac{P_s}{\sin^2 A}$ For example, with
A=75°, $P_f$=1.07$P_s$
A=60°, $P_f$=1.33$P_s$
A=40°, $P_f$=2.40$P_s$
A=30°, $P_f$=4.00$P_s$
Turning to the compressive component, $P_2$, acting perpendicular to $P_1$ and to the sheared surface, $$P_2 = P_f \times \cos A$$
$$= \frac{P_1 \times \cos A}{\sin A} = \frac{P_1}{\tan A}$$

To achieve a plastic state in the workpiece, the yield strength Y of the material must be exceeded. Thus, $P_2$ must be greater than or equal to $Y \times K \times L$ in order to obtain a good quality surface formed by plastic deformation and shearing acting together, and $P_f$ must be greater than $$\frac{Y \times K \times L}{\cos A}$$

Because, in the inventive method, shearing takes place above a die working surface 23 instead of at the edge of the die 22, the applied force gets to its maximum value 5–8 times sooner than for straight blanking. That is, whereas in straight blanking the maximum value of $P_s$ occurs at a vertical distance d' into the shearing operation, in applicant's fine shearing, the maximum value of $P_f$ occurs at a vertical distance d'' which is 5–8 times less than d'.

To summarize by reference to FIGS. 7–10, the compression surface 53 of the punch 52 is driven against the exposed surface of the workpiece 100 with a force having a component perpendicular to the die working surface 23 to put a portion of the workpiece 100 in compression between the punch 52 and the die 22. The workpiece 100 remains stationary with the help of the clamping wedge 32 and frictional forces between the workpiece 100 and the die 22. The punch 52 is driven into and through the workpiece 100 along a path predetermined by the cam arrangement. The path has a first directional component which is both perpendicular to and directed toward the die working surface 23 and a second directional component which is both parallel to the die working surface and directed toward the compressed portion of the workpiece 100. The force with which the punch 52 is driven has components both perpendicular and parallel to the path of the punch 52. The force component perpendicular to the path of the punch 52 is large enough to keep that portion of the workpiece 100 which is compressed in a plastic state. The force component parallel to the path of the tool is large enough to overcome the shear strength of the workpiece at the cutting edge 57 of the punch 52.

The bending moment tensile forces which would arise in straight blanking are reduced due to the support of the die 22 under the workpiece 100. (It appears that such forces may also be counteracted by the compressive forces induced in the workpiece.) To keep the bending moment low for as long as possible and to maintain the plastic state of the material throughout shearing, it is desirable to maintain the punch-die overlap as long as possible. Thus, the punch-die clearance should be small, on the order of 0.000 to 0.005 inches (0.127 mm), for best results. In some applications where the workpiece is shear-formed but need not be sheared all the way through, the punch 52 and die 22 could stay overlapped throughout the entire shearing operation.

In developmental work with the apparatus of the invention, it has been found that best results are obtained when fine shearing angles (A in FIG. 10b) between 20° and 60° are used. The invention is, however, applicable to all angles from very small acute angles up to almost 90°. The difficulty with small acute angles when using the apparatus described above is that it is difficult to transform a large portion of the vertical downward force of the punch press into a shearing force which is 70° or 80° different from the original downward force. This limitation of the apparatus could, however, be overcome and the inventive method practiced by using a hydraulic ram driven punch which could be positioned to deliver a shearing force at any desired angle while a second hydraulic ram connected to the same punch maintained the necessary compressive force.

Figure 15:
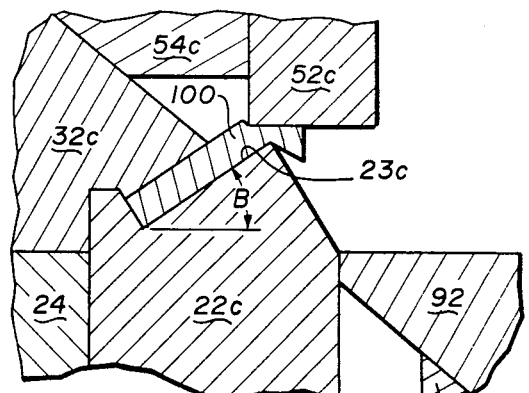
FIG. 15 is a sectional detail of an alternative form of the clamping wedge and die which permits the invention to shear steeper angles.

With the above apparatus and shearing angles greater than about 60°, the difficulty is maintaining a large enough compressive force to keep the material to be sheared in a plastic state. Again, this limitation of the apparatus could be overcome by using a hydraulically driven punch with one ram providing the steep shearing force and another acting on the same punch at 90° relative to the first to provide the compressive force. Another approach is to orient the workpiece at an angle to the die surface so that the cam angle could be kept at less than 60° while the angle at which the workpiece would be sheared is greater than 60°. FIG. 15 shows an alternative form of the invention utilizing this approach. In FIG. 15 the die 22c has a working surface 23c which is tilted upward at an angle B relative to the horizontal. The workpiece 100 rests on this tilted surface and is held by a clamping wedge 32c adapted to fit the altered die working surface 23c. The punch holder 54c holds a punch 52c which now attacks the workpiece at an effective angle which is greater than the angle determined by the cam surface of clamping wedge 32c.

To summarize, the method which is the subject of the present invention can be implemented in a punch press tool of the type just described or in other ways, such as with a punch driven by hydraulic rams. As can be seen from the preceding description and by reference to FIGS. 7–10, the method involves fine shearing of a metal workpiece 100. The workpiece 100 is placed on the working surface of a die 22, leaving an exposed surface on the workpiece 100. The punch 52 or other similar tool approaches the exposed surface of the workpiece 100 and its compression surface 53 is then driven against the exposed surface with a force having a component perpendicular to the working surface 23 of the die 22 such that the workpiece 100 is placed in compression between the punch 52 and the die 22. The punch 52 is then led along a predetermined path (in the apparatus described, the path is determined by a cam arrangement) into the workpiece 100. Compressive forces which act perpendicular to the path of the punch 52 exceed the yield strength of that part of the workpiece 100 which is compressed and keep it in a plastic state. Shearing forces which act parallel to the path of the punch 52 exceed the shear strength to the workpiece 100 at the cutting edge 57 of the punch 52.

One of the advantages of the invention is its elegant simplicity. The method in its simplest form involves a stationary die, a workpiece held stationary at the edge of the die and a single punch or tool which makes a single motion, delivering both compressive and shearing forces. Shearing and drawing by cold flowing is induced and the fracturing or spalling normally associated with blanking or shearing is prevented. In addition, and quite importantly, the shearing and cold flowing produces a smooth surface (a 10 to 70 microinch surface finish has typically been achieved) with a strong, work-hardened surface and structure, reducing or eliminating the need for finishing subsequent to the punch operation. With most metals the cold flowing results in significant work hardening of the material at the sheared surface, yielding a better wearing part. If work hardening yields undesirable characteristics, subsequent heat treating will overcome these. The invention appears applicable to all metals and other materials which behave similarly, although minor accomodations may need to be made in view of the varying yield, ultimate and shear strength characteristics, as well as brittleness and speed at which work-hardening occurs.

Another primary advantage of the invention is the speed with which parts can be formed. The fine shearing of the present invention takes place in a fraction of a second. The total time to insert, shear and remove a workpiece is expected to be seconds as mass production methods are developed. This compares favorably with the time required to form metal parts by machining or other methods.

The method and apparatus of the present invention have been the subject of developmental work to determine the quality of the fine sheared surfaces which are produced. A Ferracute Model CG34 ½ mechanical punch press having a maximum capacity of 75 tons was used to make straight angular sheared cuts through sheet stock 1 inch wide of various thicknesses, at shear angles of 30°, 40°, 60° and 75°. Sheet stock of "01" and "S7" tool steel, cold rolled steel and aluminum was used. The results of these experiments confirmed the accuracy of the above formula $P_f = P_s/\sin^2 A$ as a first-order approximation of the press force required.

In other tests, cutting blades were formed by fine shearing at approximately 40° cold rolled carbon steel one-fourth inch thick and D2 tool steel one-eighth inch thick. Certain cutting blades made from the D2 tool steel were heat treated or both annealed and heat treated to see if blade quality could be improved. The various blades were subjected to hardness testing, yielding the following results (hardness varied somewhat according to location on the blade):

| | Knoop Hardness Number (500 g load) | Equivalent Rockwell Hardness |
|---|---|---|
| Cold rolled steel - ¼" | 201–251 | 90.0–100.0 (B scale) |
| D2 tool steel - ⅛" | 223–367 | 29.0–36.5 (C scale) 94.5–97.0 (B scale) |
| D2 tool steel - heat treated ⅛" | 658–745 | 56.5–60.5 (C scale) |
| D2 tool steel - annealed & heat treated - ⅛" | 662–745 | 56.5–60.5 (C scale) |

Figure 11:
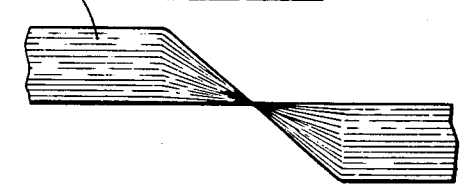
FIG. 11 is a side elevational detail of a workpiece formed by the apparatus of FIGS. 1-6, including the scrap portion, which shows the grain structure after fine shearing.

In addition, it appeared that heat treating reduced the flow lines visible in parts formed by fine shearing only (FIG. 11), without heat treating.

Figure 14B:
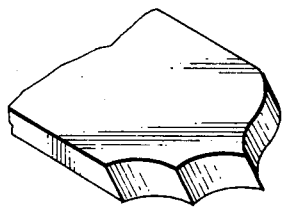
Figure 2:
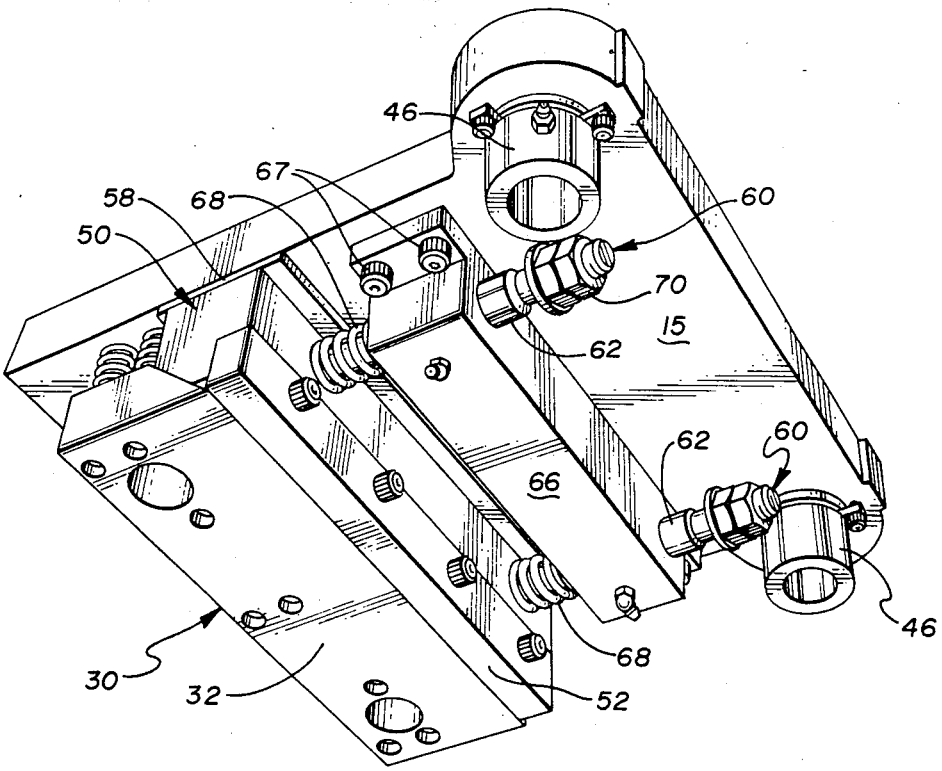
FIG. 2 is a perspective view looking up at the under side of the upper half of the apparatus of FIG. 1.

Among the surfaces which may be formed in accordance with the present invention are beveled edges having a flat surface at a given angle (FIG. 11, which shows completed part and scrap just at point of separation) or beveled edges having a convex surface (FIG. 14a). It is also possible to form surfaces which are non-linear, by suitable selection of the shape of the trailing edge of a punch, with a corresponding die (FIGS. 13, 14b). Accordingly, the possible shapes achievable with the present invention is quite large.

With large workpieces which are not to be sheared completely through, another variation of the invention is possible. For instance if a bevel were to be placed along the upper edge of a thick metal plate, the method could be used with the plate placed on a firm surface and held stationary during the shearing action. In effect, the plate then serves as its own die.

With workpieces which do not have a flat upper surface the compression surface of the die will need to be adapted to permit compressive forces to be applied without disturbing a desired surface shape. For example, if the workpiece to be sheared included a linear ridge running perpendicular to the die edge, the compression surface of the punch could be shaped to conform to the ridge so that it, as well as adjacent surfaces, would be subjected essentially equally to the compressive forces necessary for operation of the method.

The description of the preferred embodiments herein is quite specific. Those skilled in the art will perceive modifications which can be made in these embodiments without departing from the the spirit of the invention. Accordingly, it is intended by the appended claims to cover all such embodiments as fall within the true spirit and scope of the invention.

Having thus described the invention, what is claimed as new and desired to be protected by Letters Patent is:

1. A method of fine shearing a workpiece which comprises:
   (a) placing the workpiece on a working surface of a stationary die, leaving an exposed surface on the workpiece;
   (b) approaching the exposed surface of the workpiece with a moving tool having a compression surface with a cutting edge such that at least a portion of the compression surface of the tool and the working surface of the die overlap when the tool first contacts the workpiece;
   (c) driving the compression surface of the tool against the exposed surface of the workpiece with a force having a component perpendicular to the working surface of the stationary die to put a portion of the workpiece in compression between the tool and the die while keeping both the die and workpiece stationary;

(d) while continuing to keep the die and workpiece stationary, driving the tool along a predetermined path into and through at least a portion of the workpiece, said path having a first directional component both perpendicular to and directed toward the die working surface and also simultaneously a second directional component both parallel to the die working surface and directed toward the compressed portion of the workpiece, the force with which the tool is driven having components both perpendicular and parallel to the path or the tool, the force component perpendicular to the path of the tool being large enough to keep that portion of the workpiece which is compressed between the tool and the die in a plastic state and the force component parallel to the path of the tool being large enough to overcome the shear strength of the workpiece at the cutting edge.

2. The method recited in claim 1 wherein the steps of driving the tool against the workpiece and driving the tool into and through the workpiece comprise driving the tool with the downstroke of a punch press.

3. The method recited in claim 1 wherein the step of driving the tool along a predetermined path comprises the step of driving the tool along a path defined by a stationary cam surface connected to the stationary die.

4. The method recited in claim 1 wherein the step of driving the tool along a predetermined path comprises driving the tool along a linear path.

5. The method recited in claim 1 wherein the step of driving the tool along a predetermined path comprises driving the tool along a path which is a non-linear path.

6. The method recited in claim 5 wherein the step of driving the tool along a predetermined path comprises driving the tool along a path which is a continuous curved line.

7. The method recited in claim 1 wherein the first and second directional components of the predetermined path of the tool are such that fine shearing occurs at angles between 20° and 60° relative to the die working surface.

8. The method as recited in claim 1 further comprising driving the portion of the workpiece being sheared-off against a rigid pusher block located below the die working surface and adjacent thereto, said pusher block exerting a force in opposition to the punch force, said force in opposition helping to maintain compression in that portion of the workpiece where shearing is occurring and to counteract tensile forces which may develop in the workpiece.

9. An apparatus for fine shearing a workpiece comprising:

(a) a movable punch having a compression surface with a cutting edge;

(b) a stationary die means for supporting the workpiece on a working surface while leaving an exposed surface in the area of the desired shear cut;

(c) means for driving the compression surface and cutting edge of the punch against the exposed surface of the workpiece with a force having a component perpendicular to the working surface to put a portion of the workpiece in compression between the punch and the die while keeping the die and workpiece stationary; and (d) means for leading and driving the punch along a predetermined path into and through at least a portion of the workpiece, said path having a first directional component both perpendicular to and directed toward the die working surface and also simultaneously a second directional component both parallel to the die working surface and directed toward the compressed portion of the workpiece, the force with which the tool is driven having components both perpendicular and parallel to the path of the tool, the force component perpendicular to the path of the tool being large enough to keep that portion of the workpiece which is compressed between the tool and die in a plastic state and the force component parallel to the path of the tool being large enough to overcome the shear strength of the workpiece at the cutting edge.

10. The apparatus recited in claim 9 wherein the means for driving the punch against the exposed surface of the workpiece comprises a shank for receiving the downstroke of a punch press in which the apparatus is placed, the shank being operatively connected to the punch such that the downstroke of the punch press is transmitted to the punch.

11. The apparatus recited in claim 10 wherein the means for leading and driving the punch along a predetermined path is a cam arrangement comprising:

a stationary cam surface rigidly connected to the stationary die means;

a cam follower rigidly connected to the punch; and means for mounting the punch such that it can move in both the direction of the downstroke of the punch press and simultaneously in a direction perpendicular to the downstroke of the punch press in a manner prescribed by the cam action between the cam surface and the cam follower.

12. The apparatus recited in claim 11 wherein the cam surface is flat.

13. The apparatus recited in claim 11 wherein the cam surface is convex.

14. The apparatus as recited in claim 9 wherein the line along which the punch and die meet is straight.

15. The apparatus as recited in claim 9 wherein the line along which the punch and die meet is a continuous curved line.

16. The apparatus as recited in claim 9 wherein the line along which the punch and die meet is a discontinuous curved line.

17. The apparatus as recited in claim 8 further comprising a pusher assembly located below the die working surface and adjacent thereto which yieldingly supports that portion of the workpiece which is displaced downward as the punch is driven through the workpiece on said predetermined path.

18. The apparatus as recited in claim 9 further comprising a pusher block located below the die working surface and adjacent thereto which rigidly supports that portion of the workpiece which is displaced downward as the punch is driven through the workpiece on said predetermined path and, while supporting said portion of the workpiece, exerts a force in opposition to the punch force, said force in opposition helping to maintain compression in that portion of the workpiece where shearing is occurring and to counteract tensile forces which may develop in the workpiece.

* * * * *